US011441476B2

United States Patent
Nishiwaki

(10) Patent No.: US 11,441,476 B2
(45) Date of Patent: Sep. 13, 2022

(54) VEHICLE

(71) Applicant: YAMAHA HATSUDOKI KABUSHIKI KAISHA, Iwata (JP)

(72) Inventor: Ryoji Nishiwaki, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 17/367,721

(22) Filed: Jul. 6, 2021

(65) Prior Publication Data

US 2022/0010720 A1 Jan. 13, 2022

(30) Foreign Application Priority Data

Jul. 7, 2020 (JP) .............................. JP2020-117169

(51) Int. Cl.
*F01P 11/10* (2006.01)
*F01P 5/02* (2006.01)

(52) U.S. Cl.
CPC ................. *F01P 11/10* (2013.01); *F01P 5/02* (2013.01); *B60Y 2200/20* (2013.01)

(58) Field of Classification Search
CPC ...... F01P 11/10; F01P 5/02; F01P 5/06; F01P 2005/046; F01P 5/043; B60Y 2200/20
See application file for complete search history.

(56) References Cited

U.S. PATENT DOCUMENTS

| 3,460,644 | A | * | 8/1969 | Eyb | .......................... B60K 5/04 180/56 |
| 2002/0029912 | A1 | * | 3/2002 | MacKelvie | ............ F04D 19/005 180/68.1 |
| 2005/0029027 | A1 | | 2/2005 | Kunikata et al. | |
| 2010/0019539 | A1 | * | 1/2010 | Nakamura | ............ B62D 23/005 296/190.04 |
| 2016/0194989 | A1 | * | 7/2016 | Minoura | ............. F01N 13/1805 56/16.7 |
| 2017/0036717 | A1 | * | 2/2017 | Wakabayashi | ..... B60H 1/00285 |
| 2017/0248087 | A1 | * | 8/2017 | Reisenberger | ...... F02D 41/0007 |

(Continued)

FOREIGN PATENT DOCUMENTS

| JP | 61-145315 A | 7/1986 |
| JP | 02-42497 Y2 | 11/1990 |

(Continued)

OTHER PUBLICATIONS

Nishiwaki, "Vehicle", U.S. Appl. No. 17/367,718, filed Jul. 6, 2021.

*Primary Examiner* — Hung Q Nguyen
(74) *Attorney, Agent, or Firm* — Keating and Bennett, LLP

(57) ABSTRACT

A vehicle includes an air-path portion, an engine, and a rotating fan located more rearward than first and second seats. A wind pressure near the air-path portion located on a side surface of the vehicle is detected by a pressure sensor, and based on a detection result, an ECU controls a direction of rotation of the rotating fan. The rotating fan introduces/discharges air to/from an engine room via the air-path portion. If the pressure sensor detects a negative pressure, the rotating fan is controlled so as to discharge air from the engine room via the air-path portion. On the other hand, if the pressure sensor detects zero or a positive pressure, the rotating fan is controlled so as to introduce air to the engine room from the air-path portion.

7 Claims, 9 Drawing Sheets

(56) References Cited

U.S. PATENT DOCUMENTS

| | | | |
|---|---|---|---|
| 2018/0029463 A1* | 2/2018 | Ajisaka | B60K 11/04 |
| 2019/0193553 A1* | 6/2019 | Uno | B60K 11/08 |
| 2020/0298695 A1* | 9/2020 | Nagatomi | B60H 1/00507 |
| 2021/0094627 A1* | 4/2021 | Clark | B60N 2/0843 |

FOREIGN PATENT DOCUMENTS

| | | | | |
|---|---|---|---|---|
| JP | 4179088 B2 | | 11/2008 | |
| JP | 5044500 B2 | | 10/2012 | |
| JP | 2017071263 A | * | 2/2017 | |
| JP | 2018-035675 A | | 3/2018 | |
| JP | 2021075082 A | * | 5/2021 | A01D 43/063 |

* cited by examiner

F I G. 7
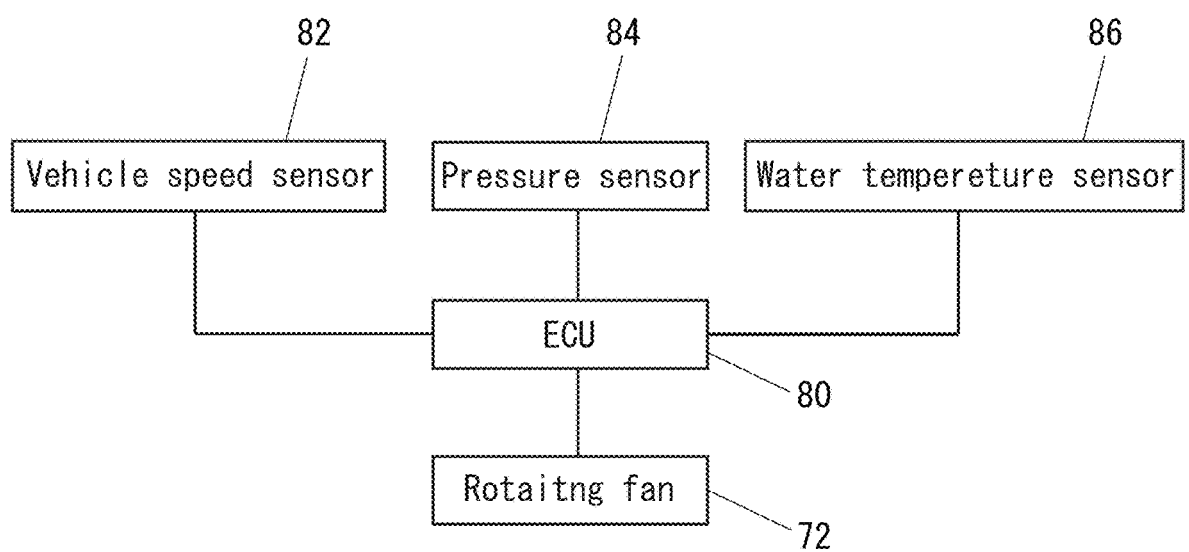

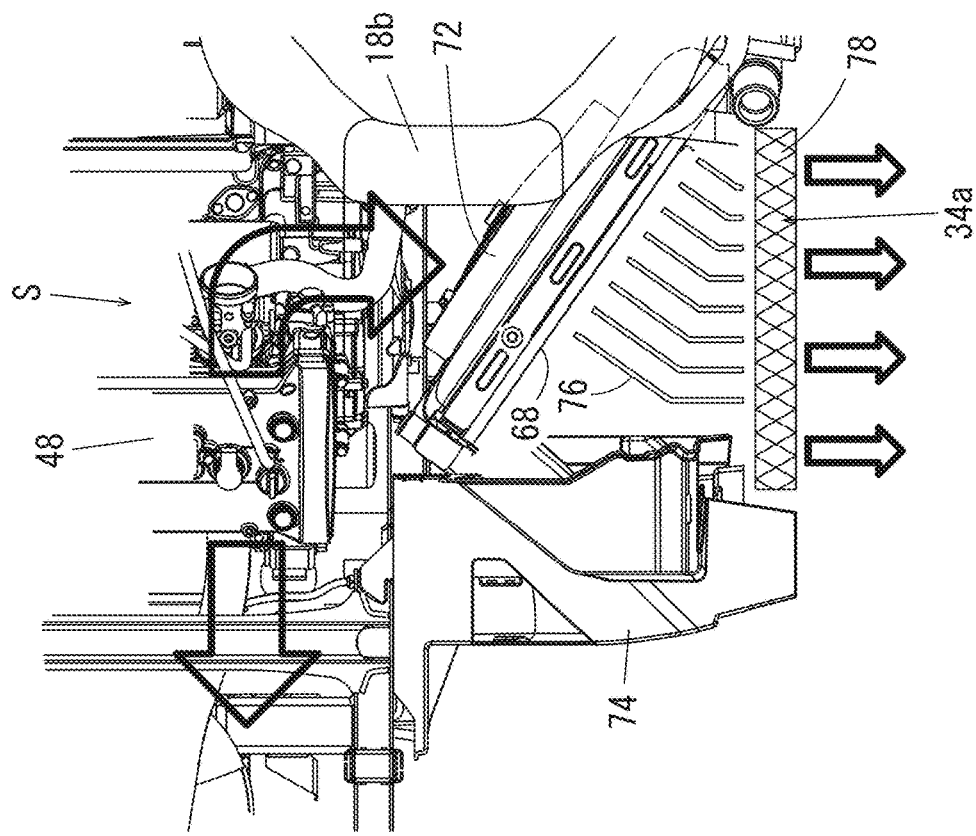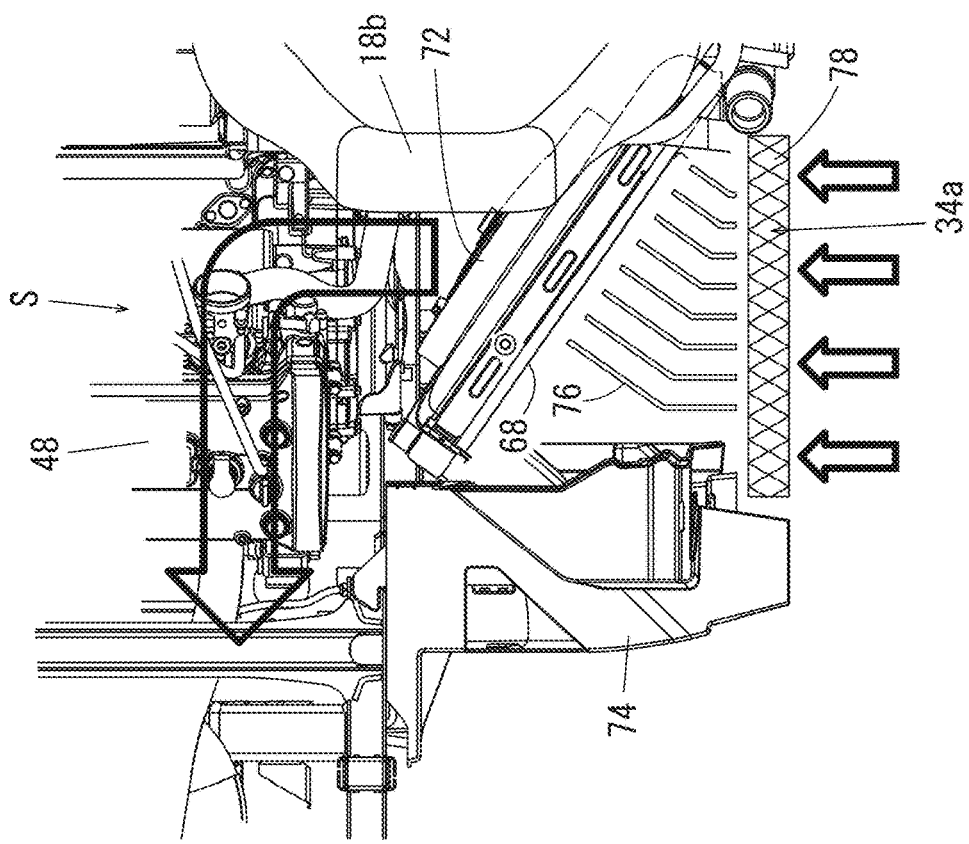

VEHICLE

CROSS REFERENCE TO RELATED APPLICATIONS

This application claims the benefit of priority to Japanese Patent Application No. 2020-117169 filed on Jul. 7, 2020. The entire contents of this application are hereby incorporated herein by reference.

BACKGROUND OF THE INVENTION

1. Field of the Invention

The present invention relates to vehicles, and more specifically to ROVs (Recreational Off-Highway Vehicles) and the like.

2. Description of the Related Art

Conventionally, there is proposed a vehicle which makes use of a fan and ventilates an engine room in order to discharge heat from the engine room. JP-A 2018-35675 discloses an example which is pertinent to conventional techniques of this kind. JP-A 2018-35675 discloses a vehicle, in which an engine is disposed at a front portion of the vehicle, and a radiator and a blower are disposed ahead of the engine. When the engine is in operation, the blower sends the air in a first direction in which air outside of the engine room flows into the engine room. On the other hand, when the engine stops its operation, the blower sends the air in a second direction in which air inside of the engine room is discharged outside of the engine room. With the arrangement described above, it becomes possible to discharge heat accumulated in the engine room to outside of the engine room when the engine is stopped.

The technique disclosed in JP-A 2018-35675, in which the engine is disposed at a front portion of the vehicle, is for application to those vehicles which can introduce air easily into the engine room from ahead of the vehicle.

Therefore, it is not possible to utilize the same control as disclosed in JP-A 2018-35675 in a vehicle where an engine is disposed behind the seat and therefore it is difficult to supply wind from ahead of the vehicle to the region behind the seat where the engine is disposed. Also, if such a vehicle is provided with an air-path portion on a side of the vehicle to lead to the region where the engine is disposed, and is provided also with a fan, there is a possibility that air cannot be sent effectively from the air-path portion to the region where the engine is disposed even if the fan is driven when the vehicle is traveling at a high speed and outside of the vehicle is under a negative pressure.

SUMMARY OF THE INVENTION

Preferred embodiments of the present invention provide vehicles that are each able to generate an air flow efficiently in the region where the engine is disposed even in cases where the engine is disposed at a more rearward position than the vehicle's seat.

According to an aspect of a preferred embodiment of the present invention a vehicle includes an air-path portion. The vehicle includes a first seat for a driver; a second seat located next to the first seat; an engine located more rearward than the first seat and the second seat; a rotating fan located more rearward than the first seat and the second seat to introduce/discharge air through the air-path portion to/from a region where the engine is disposed; a detector to detect a condition of the vehicle; and a controller configured or programmed to control a direction of rotation of the rotating fan based on a detection result from the detector. In this arrangement, the air-path portion is located more rearward than the first seat and the second seat and on a side surface of the vehicle.

According to a preferred embodiment of the present invention, it is possible, by detecting the condition of the vehicle, to appropriately control the direction of rotation of the rotating fan depending on the condition of the vehicle, and to introduce and discharge air smoothly to and from the region where the engine is disposed via the air-path portion which is located more rearward than the first seat and the second seat. The arrangement makes it possible to generate an air flow effectively in the region where the engine is disposed even in cases where the engine is disposed at a more rearward position than the seats.

Preferably, the detector detects information correlated with a wind pressure near the air-path portion as the condition of the vehicle. The outside air pressure (wind pressure) of the vehicle varies according to traveling conditions of the vehicle. For example, when the vehicle is traveling at a high speed, a negative pressure occurs on the outer side of the vehicle near the air-path portion, and on the other hand, when the vehicle is stopped, for example, a negative pressure does not occur (zero or a positive pressure occurs). Therefore, by detecting the information correlated with the wind pressure near the air-path portion, it is possible to measure or estimate the wind pressure near the air-path portion of the vehicle, and the direction of rotation of the rotating fan is controlled so that it does not blow against the wind pressure. The arrangement makes it possible to switch the blowing direction in accordance with the wind pressure near the air-path portion, making it possible to smoothly introduce and discharge air to and from the region where the engine is disposed via the air-path portion.

Further preferably, the detector includes a pressure sensor to detect a wind pressure near the air-path portion, and the controller is configured or programmed to control the direction of rotation of the rotating fan based on a detection result from the pressure sensor. In this case, it is possible, with the pressure sensor, to detect the wind pressure near the air-path portion highly accurately.

Further, preferably, the controller is configured or programmed to control the rotating fan so as to discharge air from the region where the engine is disposed via the air-path portion if the pressure sensor detects a negative pressure. In this case, by controlling the rotating fan to discharge air from the region where the engine is disposed via the air-path portion without going against the negative pressure which occurs on the outer side of the vehicle, it becomes possible to allow an air flow to occur efficiently in the region where the engine is disposed.

Preferably, the controller is configured or programmed to control the rotating fan so as to introduce air to the region where the engine is disposed via the air-path portion if the pressure sensor detects zero or a positive pressure. In this case, it is possible when the vehicle is stopped, for example, to cool the engine and the surroundings thereof by introducing fresh air from outside of the vehicle.

Further preferably, the pressure sensor is located farther outward on the vehicle than the rotating fan. In this case, it becomes easier to detect wind pressure fluctuations near the air-path portion.

Further preferably, the vehicle further includes a rear wheel, the pressure sensor is located more forward than the rear wheel, and a shield is provided between the pressure sensor and the rear wheel. In this case, it is possible, with the shield, to shield against flying objects from the rear wheel and decrease damage to the pressure sensor.

Further, preferably, an axis of rotation of the rotating fan extends in a direction toward the region where the engine is disposed. In this case, it becomes possible to introduce or discharge air efficiently to and from the region where the engine is disposed regardless of the direction in which the rotating fan has its surface oriented (whichever direction of up, down, left, right, and diagonal).

Preferably, the vehicle further includes a radiator provided between the air-path portion and the engine and supplied with air from the rotating fan via the air-path portion. In this case, air from outside is cooled by the radiator and then introduced into the region where the engine is disposed. Therefore, it is possible to effectively cool the engine and the surroundings thereof.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a block diagram which shows a primary portion of an electrical configuration of the vehicle according to a preferred embodiment of the present invention.

FIG. 9A is a diagram which shows an air flow generated when a vicinity of an air-path portion (outside space facing the vehicle's side surface) has zero or a positive wind pressure; and FIG. 9B is a diagram which shows an air flow generated when a vicinity of an air-path portion (outside space facing a side surface of the vehicle) has a negative wind pressure.

DETAILED DESCRIPTION OF THE PREFERRED EMBODIMENTS

Figure 1:
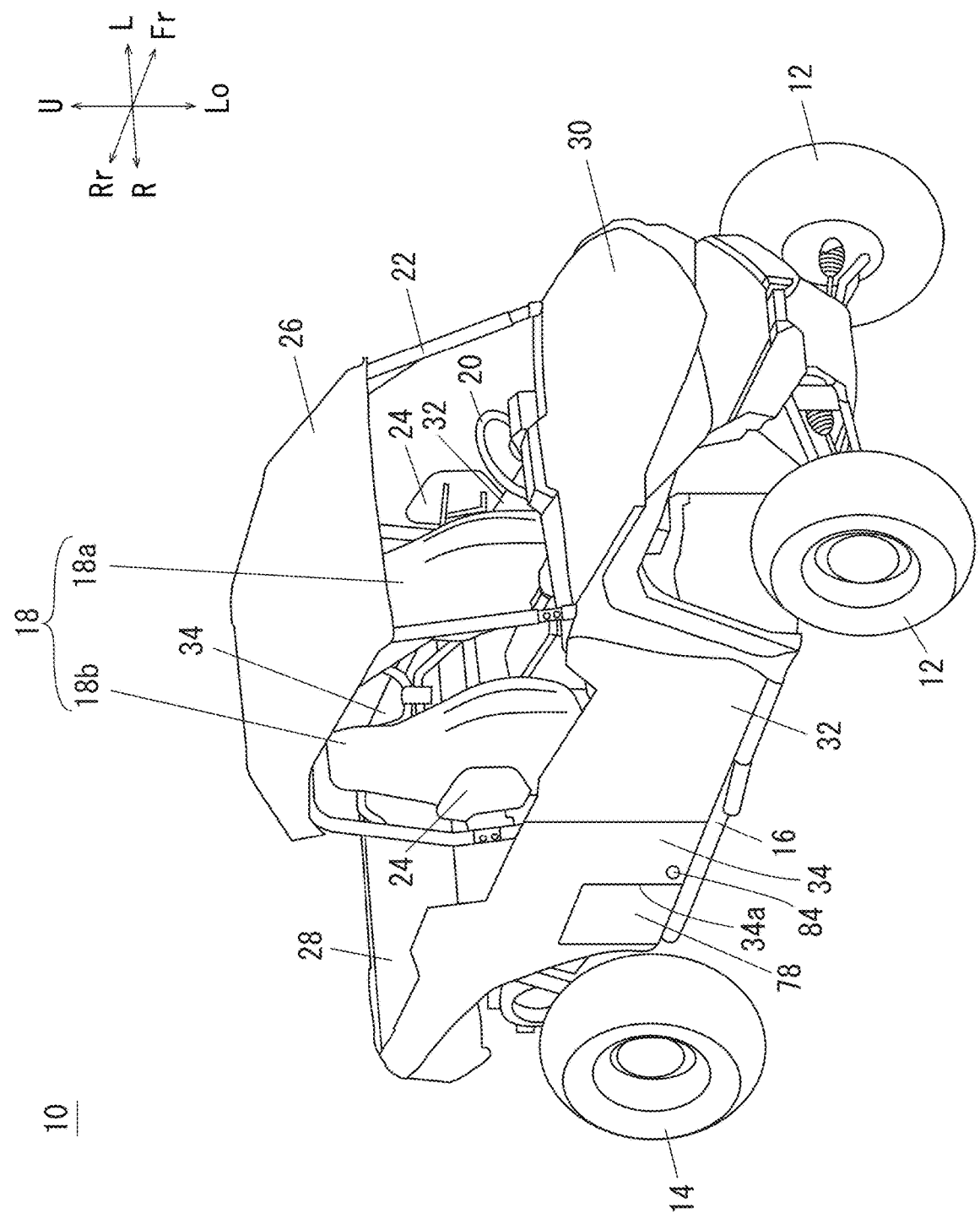
FIG. 1 is a perspective view which schematically shows a vehicle according to a preferred embodiment of the present invention.

Hereinafter, preferred embodiments of the present invention will be described with reference to the drawings. It should be noted here that the terms front and rear, left and right, and up and down used in the preferred embodiments of the present invention refer to front and rear, left and right, and up and down based on the state where a driver of the vehicle 10 is seated in a first seat 18a, facing a steering wheel 20. In the drawings, "Fr" indicates forward, "Rr" indicates rearward, "R" indicates rightward, "L" indicates leftward, "U" indicates upward and "Lo" indicates downward.

Referring to FIG. 1, a vehicle 10 according to a preferred embodiment of the present invention is an ROV vehicle for off-road use, of a type so called midship vehicle. The vehicle 10 includes a pair of front wheels 12, a pair of rear wheels 14, a frame 16, a seat portion 18, the steering wheel 20, a roll-over protection cage 22, shoulder bolster portions 24, a roof 26, a cargo bed 28, a body panel 30, doors 32 and a rear panel 34.

Figure 2:
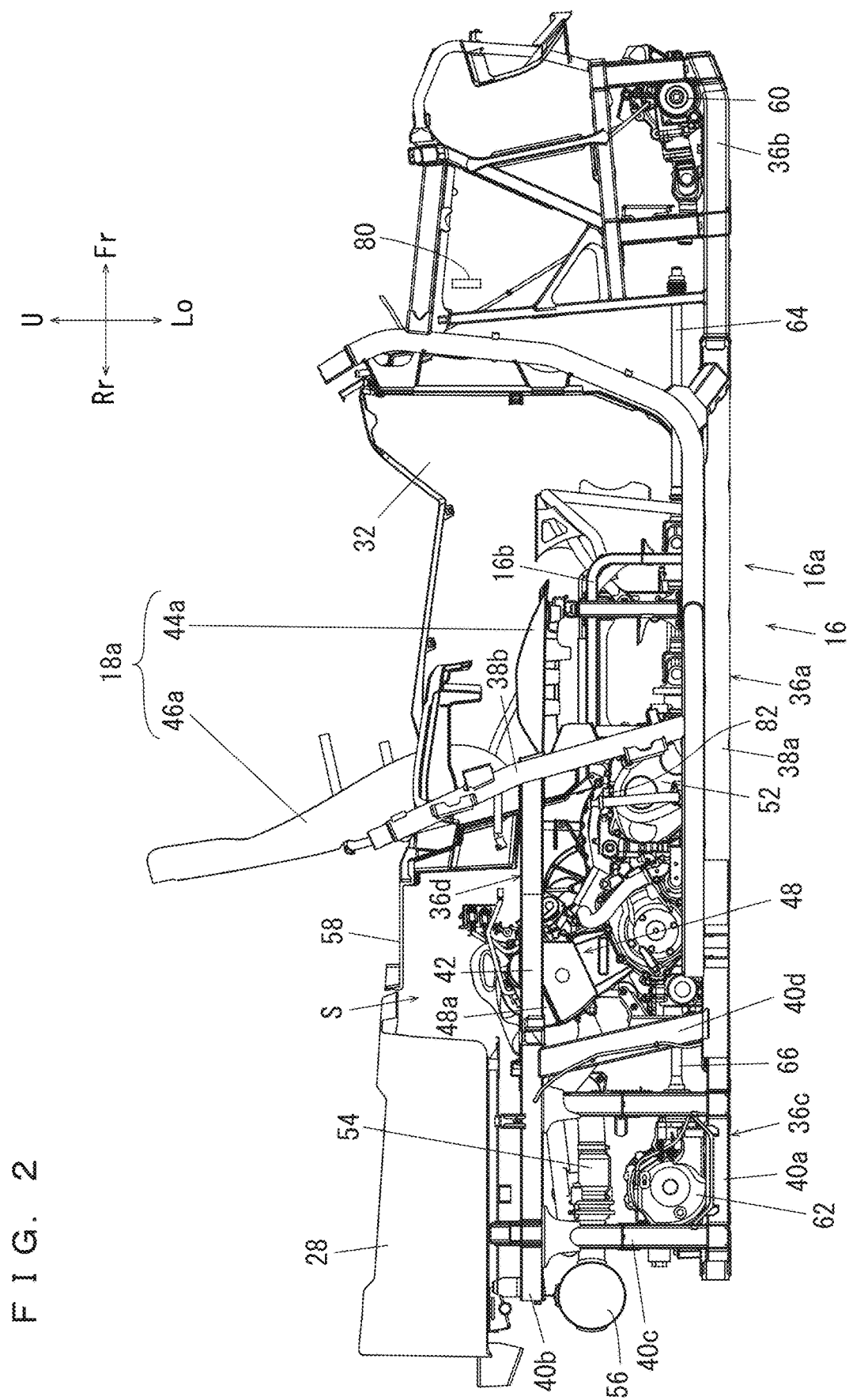
FIG. 2 is a side view which shows a frame, a first seat, an engine, a transmission, a cargo bed, etc.
Figure 3:
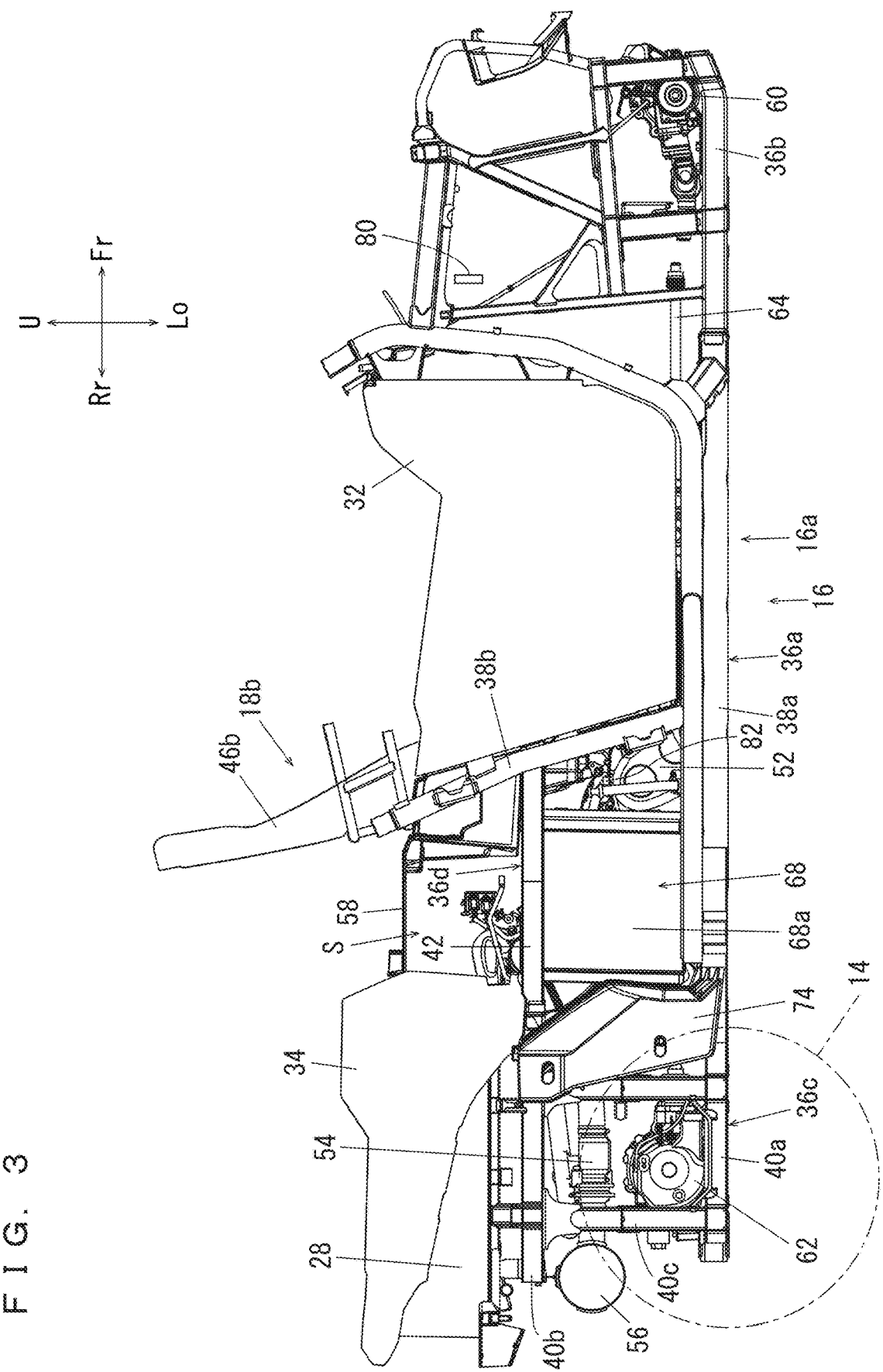
FIG. 3 is a side view which shows the frame, a second seat, a radiator, a shield, the cargo bed, etc.
Figure 4:
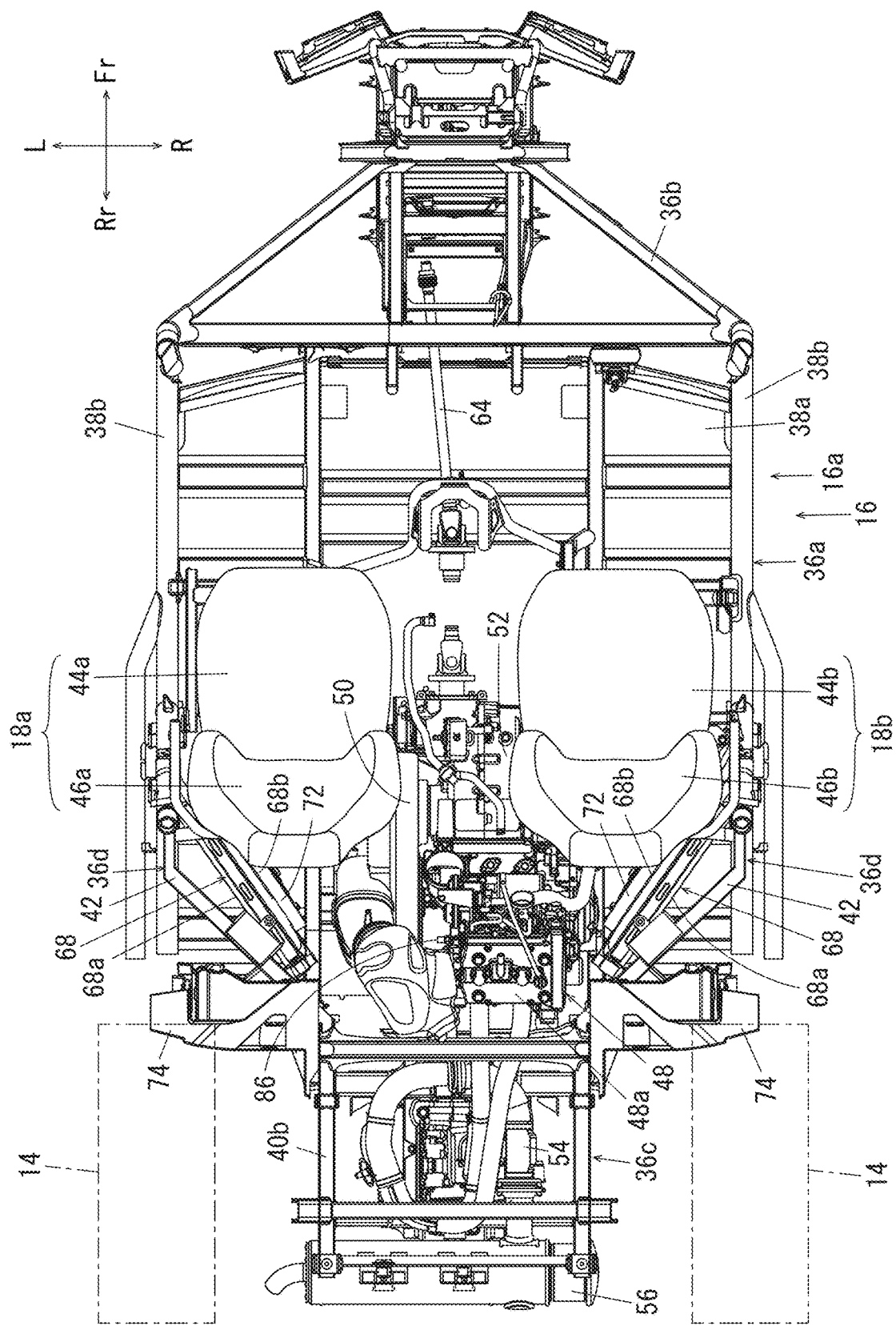
FIG. 4 is a plan view which shows the frame, the first seat, the second seat, the radiator, a rotating fan, the engine, the transmission, etc.

The frame 16 is supported by the pair of front wheels 12 and the pair of rear wheels 14. Referring to FIG. 2 through FIG. 4, the frame 16 includes a main frame portion 16a which is supported by the pair of front wheels 12 and the pair of rear wheels 14, and a seat frame portion 16b which is supported by the main frame portion 16a. The main frame portion 16a includes an intermediate portion 36a, a front portion 36b, a rear portion 36c, and a pair of connecting portions 36d.

The intermediate portion 36a includes a substantially rectangular platy portion 38a and a pair of support frame portions 38b. The pair of support frame portions 38b are provided at two end regions, in the vehicle's width direction, of the platy portion 38a.

The front portion 36b is ahead of the intermediate portion 36a, and jointed to the intermediate portion 36a.

The rear portion 36c is narrower than the intermediate portion 36a, and is behind the intermediate portion 36a. The rear portion 36c includes a frame lower portion 40a; a frame upper portion 40b; a connecting portion 40c which connects the frame lower portion 40a and the frame upper portion 40b to each other; and a connecting portion 40d which connects the frame upper portion 40b and the platy portion 38a of the intermediate portion 36a.

Each of the pair of connecting portions 36d preferably has a general V shape, providing a connection between a substantially intermediate region, in an up-down direction, of the support frame portion 38b of the intermediate portion 36a and a front end region of the frame upper portion 40b of the rear portion 36c. The pair of connecting portions 36d each include a slanted portion 42 which extends rearward and diagonally inward, toward the rear portion 36c. In other words, the pair of slanted portions 42 extend diagonally from the intermediate portion 36a side toward the rear portion 36c so that their mutual distance becomes smaller.

Referring to FIG. 1, FIG. 2 and FIG. 4, the seat portion 18 includes the first seat 18a for a driver, and a second seat 18b located next to the first seat 18a for a passenger. The first seat 18a includes a first seating portion 44a and a first backrest portion 46a while the second seat 18b has a second seating portion 44b and a second backrest portion 46b. The first seating portion 44a, the first backrest portion 46a, the second seating portion 44b and the second backrest portion 46b are supported by the seat frame portion 16b. In other words, the first seat 18a and the second seat 18b are supported by the frame 16.

Referring to FIG. 1, the steering wheel 20 is provided ahead of the first seat 18a of the seat portion 18. The roll-over protection cage 22 is provided in a manner to encage the seat portion 18 and the steering wheel 20. The roll-over protection cage 22 is supported by the frame 16. More specifically, the roll-over protection cage 22 is jointed to upper end regions of the pair of support frame portions 38b.

The pair of support frame portions 38b each include the shoulder bolster portion 24. The roof 26 is provided at an upper portion of the roll-over protection cage 22. The cargo bed 28 is located at a more rearward position than the first seating portion 44a and the second seating portion 44b, and is supported by the frame 16 at a more rearward position than the roll-over protection cage 22, pivotably in an up-down direction. More specifically, the cargo bed 28 is supported by the frame upper portion 40b of the rear portion 36c.

Referring to FIG. 1 through FIG. 3, the body panel 30 is provided on the front portion 36b. The door 32 is provided on each side, in the vehicle's width direction, of the seat portion 18. The rear panel 34 is provided behind each door 32. In each rear panel 34, an air-path portion 34a is provided to introduce air to a radiator 68 (which will be described later). In other words, the air-path portion 34a is provided on a side surface of the vehicle 10, on a side of the radiator 68. In other words, the air-path portion 34a is provided at a more rearward position than the first seat 18a and the second seat 18b, on a side surface of the vehicle 10. FIG. 3 shows only a portion of the rear panel 34.

The vehicle 10 further includes a transfer mechanism (not illustrated) which transfers a movement of the steering wheel 20 to the pair of front wheels 12. The transfer mechanism may be provided by any of various known arrangements such as a rack and pinion transfer mechanism, so no more description will be made here.

Referring to FIG. 2 through FIG. 4, the vehicle 10 further includes an engine 48, a CVT (Continuously Variable Transmission) 50 provided on a side (left side in the present preferred embodiment) of the engine 48, and a transmission 52 located ahead of the engine 48. The engine 48 and the transmission 52 are jointed to each other via the CVT 50.

The engine 48 is located more rearward than a front end of the first seat 18a and the second seat 18b and at or substantially at a center of the vehicle in the vehicle width direction. In the present preferred embodiment, in a side view, the engine 48 is between the first/second seating portion 44a/44b and the rear wheels 14. The engine 48 is slightly inclined rearward, below and diagonally ahead of the cargo bed 28, with its crank shaft (not illustrated) directed in the width direction of the vehicle 10. The engine 48 is attached to a rear region of the intermediate portion 38a of the frame 16.

Referring to FIG. 2 and FIG. 4, the engine 48 has a cylinder head 48a, to which an air cleaner (not illustrated) is connected via an air intake tube (not illustrated). Also, a muffler 56 is jointed to the cylinder head 48a via an exhaust pipe 54. The engine 48 is provided with an engine cover 58 thereabove. A region surrounded by the seat portion 18, the cargo bed 28 and the engine cover 58 where the engine 48 is disposed is an engine room S.

Referring to FIG. 2 and FIG. 4, the vehicle 10 further includes a pair of suspension assemblies (not illustrated) which suspend the pair of front wheels 12, a rotation transmission portion 60 which transmits rotation outputted from the engine 48 to the pair of front wheels 12, a pair of suspension assemblies (not illustrated) which suspend the pair of rear wheels 14, a rotation transmission portion 62 which transmits rotation outputted from the engine 48 to the pair of rear wheels 14, and propeller shafts 64, 66.

The propeller shaft 64 is provided to extend forward from a lower end portion of the engine 48 while the propeller shaft 66 is provided to extend rearward from a lower end portion of the engine 48, at a substantially intermediate region in the width direction of the vehicle 10.

The frame 16 is supported by the pair of front wheels 12 and the pair of rear wheels 14 via the suspension assemblies.

The rotation transmission portion 60 is connected with the engine 48 via the propeller shaft 64, the transmission 52 and the CVT 50. The rotation transmission portion 62 is connected with the engine 48 via the propeller shaft 66, the transmission 52 and the CVT 50. Therefore, rotation of the engine 48 undergoes speed changes performed by the CVT 50 and the transmission 52, and then is transmitted to the pair of front wheels 12 via the propeller shaft 64 and the rotation transmission portion 60. This rotates the pair of front wheels 12. Also, rotation of the engine 48 undergoes speed changes performed by the CVT 50 and the transmission 52, and then is transmitted to the pair of rear wheels 14 via the propeller shaft 66 and the rotation transmission portion 62. This rotates the pair of rear wheels 14.

Referring to FIG. 2 through FIG. 4, a radiator 68 is provided on each of a left and a right sides in the frame 16. Each radiator 68 includes an outer surface 68a facing rearward and outward of the vehicle, and located more rearward than the first seating portion 44a and the second seating portion 44b and lower than a lower surface of the cargo bed 28. Also, each radiator 68 is at an outer position, in the vehicle's width direction, than the engine 48, i.e., between the air-path portion 34a and the engine 48, at a more forward position than the rear wheels 14, to overlap the engine 48 and the transmission 52 in a side view. Each radiator 68 is supported by the connecting portion 36d. More specifically, referring to FIG. 5, each radiator 68 has its upper edge portion provided with two generally L-shaped elastic brackets 70a, 70b attached thereto while each radiator 68 has its lower edge portion provided with a generally strip-shaped elastic bracket 70c. With the above arrangement, each radiator 68 is supported at an inner surface of the connecting portion 36d via the brackets 70a, 70b, and is provided on the platy portion 38a of the intermediate portion 36a via the bracket 70c. Thus, each radiator 68 is disposed on an inner side of the slanted portion 42, oriented generally along the direction in which the slanted portion 42 extends, and is supported by the slanted portion 42. In the present preferred embodiment, the radiator 68 is disposed so that its outer surface 68a faces rearward-and-sideward (i.e., diagonally rearward and sideward) of the vehicle. In other words, the outer surface 68a of the radiator 68 is orthogonal to a line of direction extending rear-and-sideward (i.e., diagonally rearward and sideward) of the vehicle. Also, in a side view, each radiator 68 is located between the slanted portion 42 and the platy portion 38a.

Figure 5:
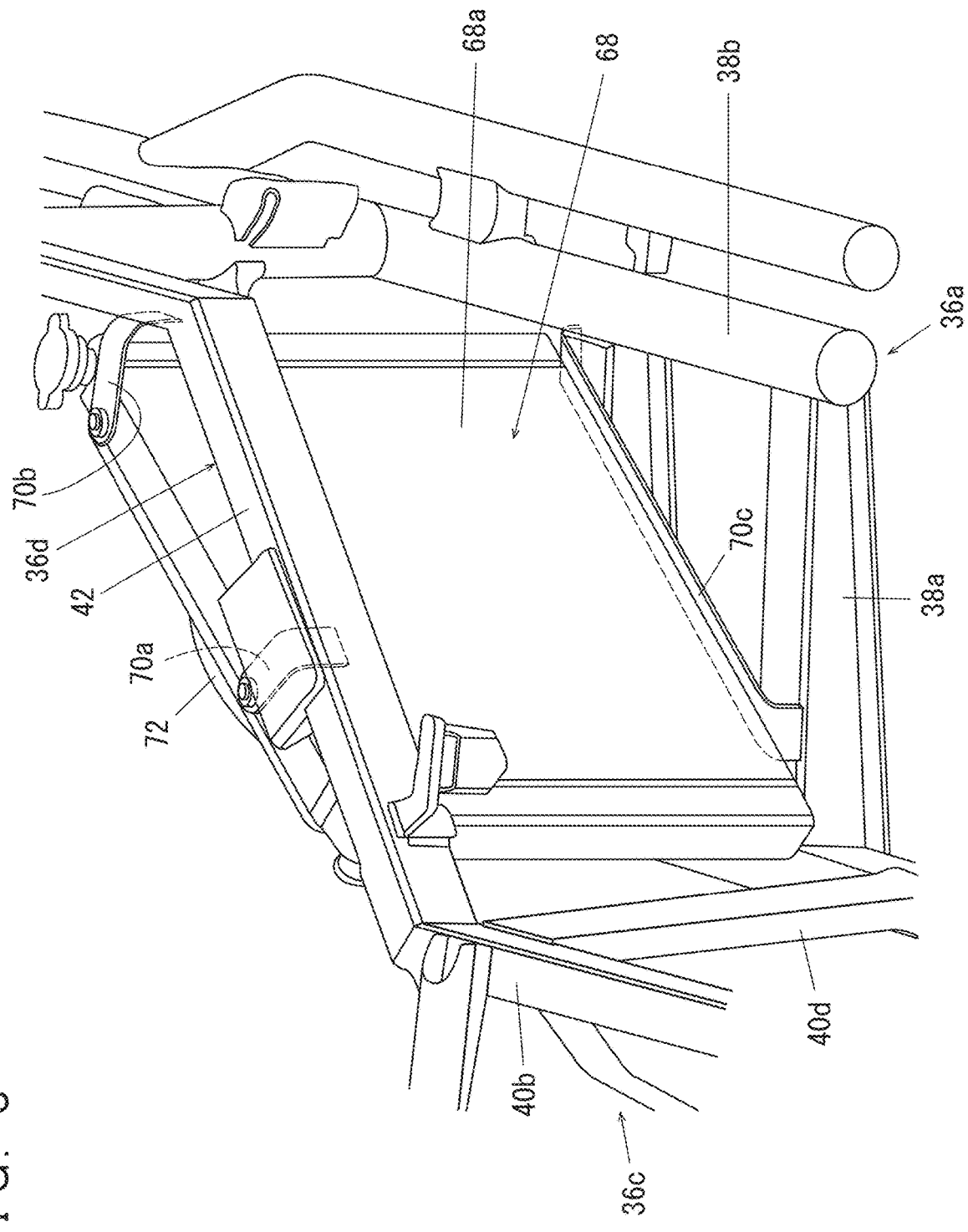
FIG. 5 is a perspective view which shows a slanted portion, the radiator, and the surroundings thereof.
Figure 6:
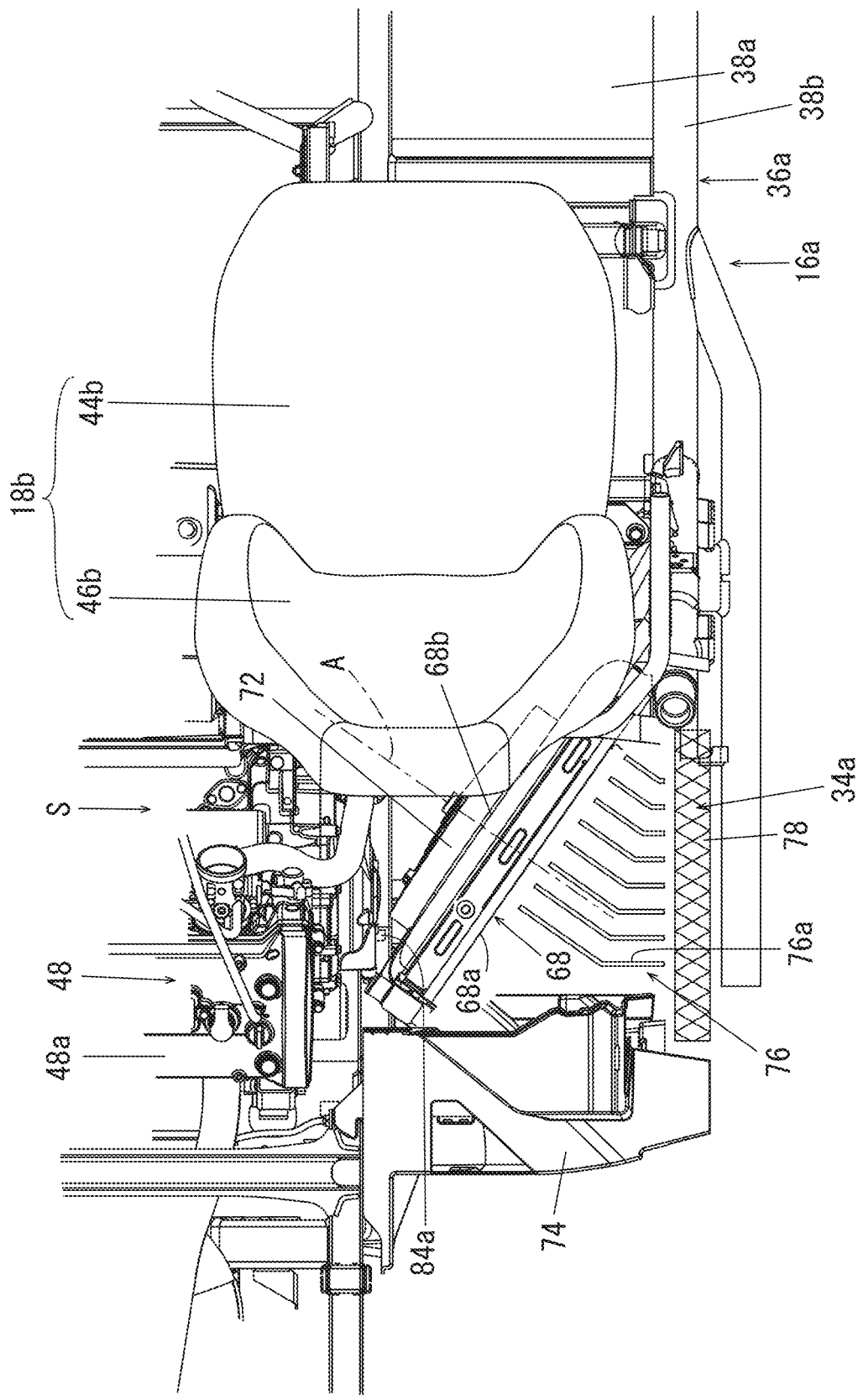
FIG. 6 is a plan view which shows the radiator, the rotating fan, a louver, a mesh, etc.

Referring to FIG. 4 through FIG. 6, a rotating fan 72 is provided on a side of an inner surface 68b of the radiator 68. The rotating fan 72 is located more rearward than the first seat 18a and the second seat 18b so that its axis of rotation A extends toward a region where the engine 48 is disposed, i.e., toward the engine room S. By operating the rotating fan 72, it is possible to introduce air from outside the vehicle via the air-path portion 34a, the outer surface 68a and the inner surface 68b of the radiator 68, to inside the vehicle especially into the engine room S, and also possible to discharge air in a reverse direction. In the present preferred embodiment, the rotating fan 72 is provided on a side of the engine room S.

Referring to FIG. 3, FIG. 4 and FIG. 6, each shield 74 is provided between the rear wheel 14 and the radiator 68. An outer end of the radiator 68 is located more inward, in the vehicle width direction, than an outer end of the shield 74. Referring also to FIG. 1, the shield 74 is provided between a pressure sensor 84 (which will be described later) and the rear wheel 14.

Referring to FIG. 6, on an outward side, in the vehicle width direction, of the radiator 68, a louver 76 is provided as an air intake to introduce air to the radiator 68. In other words, the louver 76 is provided in an air introduction path to the radiator 68. The louver 76 is provided in such a fashion that its slats 76$a$ is orthogonal or substantially orthogonal to the outer surface 68$a$ of the radiator 68. Also, on an outward side, in the vehicle's width direction, of the slats 76$a$, a mesh 78 is provided in the air-path portion 34$a$ of the rear panel 34 (see FIG. 1).

Referring to FIG. 7, the vehicle 10 further includes an ECU 80 as a controller. The ECU 80 is connected with a vehicle speed sensor 82, the pressure sensor 84, a water temperature sensor 86 and the rotating fan 72.

Referring to FIG. 2, the ECU 80 is provided on the front portion 36$b$. The vehicle speed sensor 82 is provided in the transmission 52 and detects a traveling speed of the vehicle 10. Referring to FIG. 1, the pressure sensor 84 is provided near the air-path portion 34$a$ of the rear panel 34, and detects a wind pressure near the air-path portion 34$a$. As described above, the pressure sensor 84 is provided ahead of the rear wheel 14, at a more outward region of the vehicle than the rotating fan 72. Referring to FIG. 4, the water temperature sensor 86 is provided in the engine 48, and detects a temperature of coolant inside a water jacket (not illustrated) of the engine 48. The ECU 80 controls operation of the rotating fan 72 based on detection results from the vehicle speed sensor 82, the pressure sensor 84 and the water temperature sensor 86.

It should be noted here that the pressure sensor 84 detects a wind pressure near the air-path portion 34$a$ as information correlated with a wind pressure near the air-path portion 34$a$. By using the pressure sensor 84, it is possible to detect the wind pressure near the air-path portion 34$a$ highly accurately. Also, as the traveling speed of the vehicle increases, the wind pressure (negative pressure) near the air-path portion 34$a$ increases, i.e., the traveling speed of the vehicle and the wind pressure near the air-path portion 34$a$ are correlated with each other. Thus, traveling speed of the vehicle detected by the vehicle speed sensor 82 is information correlated with the wind pressure near the air-path portion 34$a$.

In the present preferred embodiment, the vehicle speed sensor 82, the pressure sensors 84, 84$a$ (which will be described later) and the water temperature sensor 86 represent the detector to detect conditions of the vehicle 10. The ECU 80 represents the controller.

Figure 8:
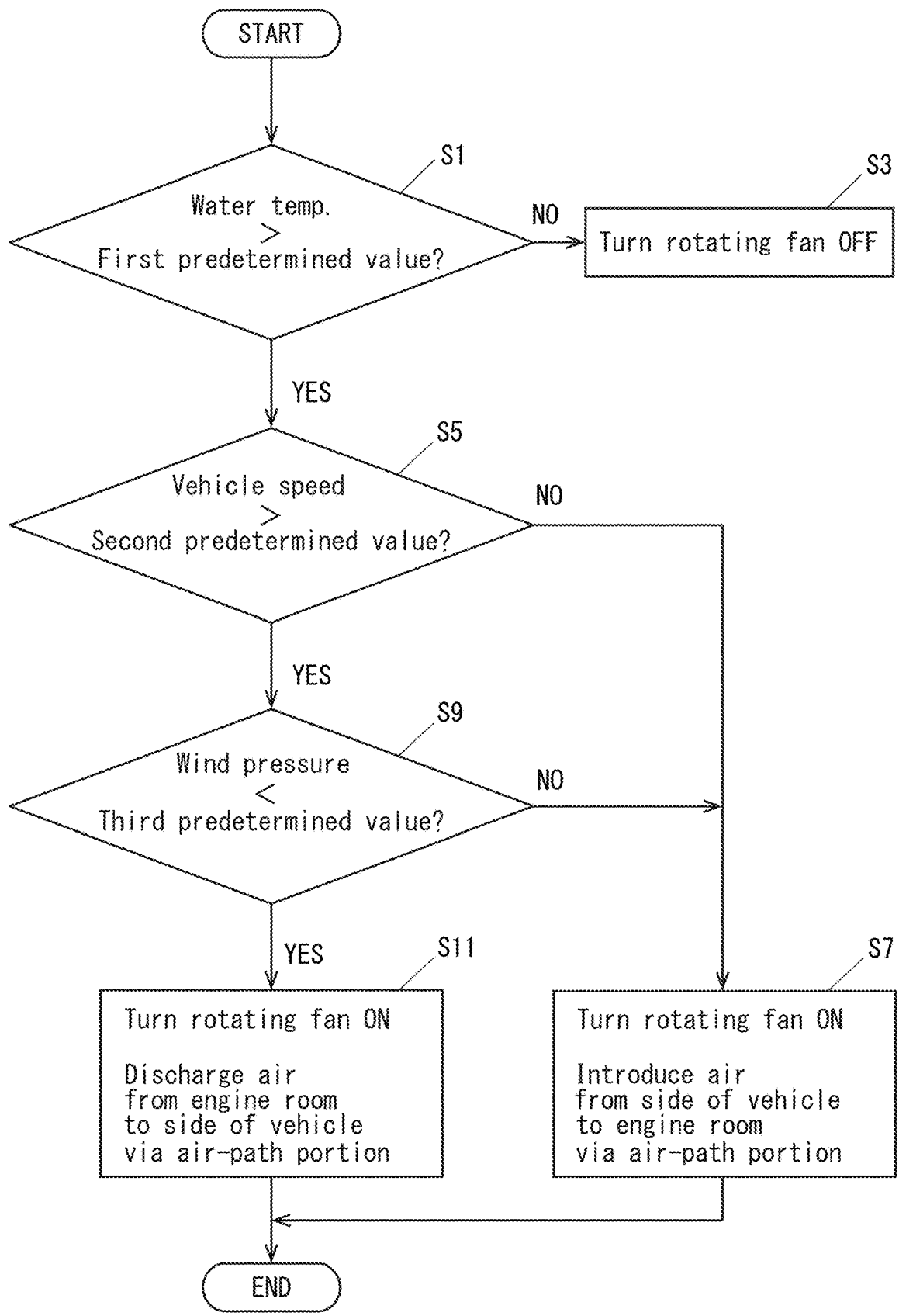
FIG. 8 is a flowchart which shows an example of a primary operation of a vehicle according to a preferred embodiment of the present invention.

Referring to FIG. 8, an example of a primary operation of the vehicle 10 will be described.

First, the water temperature sensor 86 detects a temperature of coolant in the water jacket. The ECU 80 determines whether or not the detected temperature is greater than a first predetermined value (the predetermined temperature, which is 100 degrees Celsius, for example, in the present preferred embodiment) (Step S1). This provides the basis for determining whether or not the vehicle 10 has finished warming up. If the temperature of the coolant is not higher than the first predetermined value, the ECU 80 turns OFF the rotating fan (Step S3). In other words, it is determined that the vehicle is warming up and the warming up process has not been completed yet. As a result, the rotating fan 72 is not operated. This makes it possible to shorten the warming up time.

If Step S1 detects that the coolant temperature is higher than the first predetermined value, it is determined that the warming up process is completed, and the process goes to Step S5. In Step S5, the ECU 80 determines whether or not a vehicle's traveling speed detected by the vehicle speed sensor 82 is greater than a second predetermined value (the predetermined speed, which is 25 km per hour, for example, in the present preferred embodiment). If the traveling speed of the vehicle is not greater than the second predetermined value, the process goes to Step S7. In Step S7, the ECU 80 turns ON the rotating fan 72, and controls the direction of rotation of the rotating fan 72 so that air is introduced from a side of the vehicle into the engine room S via the air-path portion 34$a$ (see an air flow represented by a white arrow in FIG. 9A). Typically, the process moves from Step S5 to Step S7 when the vehicle is stopped. Therefore, when the vehicle is stopped, the direction of rotation of the rotating fan 72 is controlled so that air is introduced from the side of the vehicle into the engine room S via the air-path portion 34$a$ regardless of the output value from the pressure sensor 84.

If Step S5 detects that the traveling speed of the vehicle is greater than the second predetermined value, the ECU 80 determines whether or not a wind pressure near the air-path portion 34$a$ detected by the pressure sensor 84 is smaller than a third predetermined value (the predetermined pressure, which is 0 Pa, for example, in the present preferred embodiment) (Step S9). If the wind pressure is not smaller than the third predetermined value (0 or a positive pressure in the present preferred embodiment), the process goes to Step S7.

If Step S9 detects that the wind pressure is smaller than the third predetermined value (a negative pressure in the present preferred embodiment), the process goes to Step S11, and the ECU 80 turns ON the rotating fan 72, and controls a direction of rotation of the rotating fan 72 so that air is discharged from the engine room S to the side of the vehicle via the air-path portion 34$a$ (see an air flow represented by white arrows in FIG. 9B). Typically, the process moves from Step S5 to Step S11 via Step 9 when the vehicle is traveling at a high speed.

As described above, air flow is controlled by switching the direction of rotation of the rotating fan 72 depending on an outside air pressure (wind pressure) of the vehicle 10.

According to the vehicle 10 as described thus far, it is possible, by detecting conditions of the vehicle 10, to appropriately control the direction of rotation of the rotating fan 72 depending on the conditions of the vehicle 10, and it is possible to introduce and discharge air smoothly to and from the region where the engine 48 is disposed (engine room S) via the air-path portion 34$a$ which is located more rearward than the first seat 18$a$ and the second seat 18$b$. The arrangement makes it possible to generate an air flow effectively in the region where the engine 48 is disposed even in cases where the engine 48 is disposed at a more rearward position than the seat portion 18.

The outside air pressure (wind pressure) to the vehicle 10 varies according to traveling conditions of the vehicle 10. For example, when the vehicle is traveling at a high speed, a negative pressure occurs on the outer side of the vehicle near the air-path portion 34$a$, and on the other hand, when the vehicle is stopped, for example, a negative pressure does not occur (zero or a positive pressure occurs). Therefore, by detecting information correlated with the wind pressure near the air-path portion 34$a$, it is possible to measure or estimate the wind pressure near the air-path portion 34$a$ of the vehicle 10, and the direction of rotation of the rotating fan 72 is controlled so as not to blow against the wind pressure. The arrangement makes it possible to switch the blowing direction in accordance with the wind pressure near the air-path portion 34$a$, making it possible to smoothly introduce and discharge air into and from the region where the engine 48 is disposed via the air-path portion 34$a$.

By using the pressure sensor 84, it is possible to detect the wind pressure near the air-path portion 34$a$ highly accurately.

By controlling the rotating fan 72 to discharge air from the region where the engine 48 is disposed via the air-path portion 34a without going against the negative pressure which occurs on the outer side of the vehicle, it becomes possible to allow an air flow to occur efficiently in the region where the engine 48 is disposed.

For example, it is possible to cool the engine 48 and the surroundings thereof when the vehicle is stopped by introducing fresh air from outside of the vehicle.

By locating the pressure sensor 84 at a more outward region of the vehicle than the rotating fan 72, it becomes easier to detect wind pressure fluctuations near the air-path portion 34a.

It is possible, with the shield 74, to shield against flying objects from the rear wheels 14 and decrease damage caused to the pressure sensor 84.

By providing the rotating fan 72 with its axis of rotation A extending in the direction in which the region where the engine 48 is disposed, it becomes possible to introduce or discharge air efficiently into and from the region where the engine 48 is disposed regardless of the direction in which the rotating fan 72 has its surface oriented (whichever direction of up, down, left, right, and diagonal).

Since air from outside is cooled by the radiator 68 and then introduced into the region where the engine 48 is disposed, it is possible to effectively cool the engine 48 and the surroundings thereof.

It should be noted here that in the operation described with reference to FIG. 8, the process goes to Step S11 only when all of the Steps S1, S5 and S9 are YES. However, preferred embodiments of the present invention are not limited to this. The process may go to Step S7 or S11 based only on a comparison result of the traveling speed of the vehicle shown in Step 5 and the second predetermined value. Also, the process may go to Step S7 or S11 based only on a comparison result of the wind pressure shown in Step 9 and the third predetermined value. Further, the process may go to Step S7 or S11 based only on a comparison result of the coolant temperature detected by the water temperature sensor 86 and a predetermined value (not limited to the first predetermined value).

Also, as shown in FIG. 6, there may be an arrangement which utilizes a pressure sensor 84a located near the rotating fan 72 of the engine 48. The pressure sensor 84a detects a wind pressure around the rotating fan 72. Wind direction around the rotating fan 72 and wind direction near the air-path portion 34a are the same; wind pressure around the rotating fan 72 and wind pressure near the air-path portion 34a are correlated with each other, and wind pressure around the rotating fan 72 is information correlated with the wind pressure near the air-path portion 34a. Therefore, instead of the pressure sensor 84, the pressure sensor 84a may be used and the process may go to Step S7 or S11 based on a comparison result in Step S9 in FIG. 8 of the wind pressure detected by the pressure sensor 84a and a predetermined value (not limited to the third predetermined value). Also, the process may go to Step S7 or S11 based only on a comparison result of the wind pressure detected by the pressure sensor 84a and a predetermined value (not limited to the third predetermined value). Further, the process may go to Step S7 or S11 based on both detection results provided by the pressure sensors 84 and 84a.

Further, the conditions of the vehicle 10 detected by the detector may include an engine temperature, an engine room temperature, a coolant temperature, a number of rotations of the engine, an engine load, a throttle opening degree, etc., and any of these may be used as a basis to control the direction of rotation of the rotating fan 72.

The rotating fan 72 may be located on the outer surface 68a side of the radiator 68.

Location of the rotating fan 72 is not limited to a side of the engine room S but may be above or below the engine room S as far as the axis of rotation A extends toward the engine room S.

Preferred embodiments of the present invention are not limited to vehicles powered by engines, but applicable also to vehicles powered by motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle including an air-path portion, the vehicle comprising:
    a first seat for a driver;
    a second seat located next to the first seat;
    an engine located more rearward than the first seat and the second seat;
    a rotating fan located more rearward position than the first seat and the second seat to introduce/discharge air via the air-path portion to/from a region where the engine is disposed;
    a pressure sensor to detect an air pressure of the vehicle near the air-path portion; and
    a controller configured or programmed to control a direction of rotation of the rotating fan based on a detection result from the pressure sensor; wherein
    the air-path portion is located more rearward than the first seat and the second seat and opens to a side surface of the vehicle; and
    the controller is configured or programmed to control the rotating fan so as to discharge air from the region where the engine is disposed via the air-path portion when the pressure sensor detects a negative pressure.

2. The vehicle according to claim 1, wherein
    the controller is configured or programmed to control the direction of rotation of the rotating fan based on a detection result from the pressure sensor.

3. The vehicle according to claim 2, wherein the controller is configured or programmed to control the rotating fan so as to introduce air to the region where the engine is disposed via the air-path portion when the pressure sensor detects zero or a positive pressure.

4. The vehicle according to claim 2, wherein the pressure sensor is located farther outward on the vehicle than the rotating fan.

5. The vehicle according to claim 2, further comprising:
    a rear wheel; wherein
    the pressure sensor is located more forward than the rear wheel; and
    the vehicle further comprises a shield located between the pressure sensor and the rear wheel.

6. The vehicle according to claim 1, wherein an axis of rotation of the rotating fan extends in a direction toward the region where the engine is disposed.

7. The vehicle according to claim 1, further comprising a radiator located between the air-path portion and the engine to receive air from the rotating fan via the air-path portion.

* * * * *